(12) United States Patent
Michaud et al.

(10) Patent No.: US 10,887,181 B2
(45) Date of Patent: Jan. 5, 2021

(54) OUT-OF-BAND SERVICE DISCOVERY FOR PERIPHERAL DEVICES

(71) Applicant: Microsoft Technology Licensing, LLC, Redmond, WA (US)

(72) Inventors: Alain Michaud, Boischatel (CA); Heming Wen, Bellevue, WA (US); Erik O. Peterson, Kirkland, WA (US); Matthew Thomas Beaver, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 67 days.

(21) Appl. No.: 16/243,744

(22) Filed: Jan. 9, 2019

(65) Prior Publication Data
US 2020/0220783 A1    Jul. 9, 2020

(51) Int. Cl.
*G06F 15/16* (2006.01)
*H04L 12/24* (2006.01)

(52) U.S. Cl.
CPC .................... *H04L 41/12* (2013.01)

(58) Field of Classification Search
CPC ...................................... H04L 41/12
USPC ........................................ 709/224
See application file for complete search history.

(56) References Cited

U.S. PATENT DOCUMENTS

| | | | |
|---|---|---|---|
| 8,397,084 B2* | 3/2013 | Ranade | H04L 9/0894 713/193 |
| 9,788,350 B2 | 10/2017 | Park et al. | |
| 10,057,225 B1 | 8/2018 | Hayes et al. | |
| 2004/0176117 A1 | 9/2004 | Strittmatter et al. | |
| 2006/0187858 A1 | 8/2006 | Kenichi et al. | |
| 2014/0194062 A1 | 7/2014 | Palin et al. | |
| 2014/0359018 A1* | 12/2014 | Sun | H04L 65/403 709/204 |
| 2015/0208195 A1* | 7/2015 | Kariman | H04W 4/029 455/456.1 |
| 2016/0057237 A1* | 2/2016 | Yang | H04L 67/16 709/224 |

(Continued)

OTHER PUBLICATIONS

"Attribute Caching in BLE: Advantages and Pitfalls", Retrieved from: https://punchthrough.com/pt-blog-post/attribute-caching-in-ble-advantages-and-pittfalls/, May 28, 2016, 4 Pages.

(Continued)

*Primary Examiner* — Anthony Mejia
(74) *Attorney, Agent, or Firm* — Ray Quinney & Nebeker P.C; James Bullough

(57) ABSTRACT

The present disclosure relates to systems, methods, and computer-readable media for performing out-of-band discovery of service definitions to enable a central computing device to interact with one or more peripheral devices. For example, systems disclosed herein include retrieving a hash value for a peripheral device representative of a set of service attributes associated with the peripheral device. Based on the hash value, the systems disclosed herein can identify a service database entry including service definitions that enable the central computing device to interact with the peripheral devices. Using the service definitions, the central computing device can interact with any peripheral device that shares the same set of service attributes as the peripheral device.

20 Claims, 9 Drawing Sheets

(56) References Cited

U.S. PATENT DOCUMENTS

2017/0201380 A1* 7/2017 Schaap ................ H04W 12/04
2017/0201850 A1* 7/2017 Raleigh ................ G06F 3/0482
2019/0042779 A1* 2/2019 Agerstam ........... G06F 21/6218
2019/0065126 A1* 2/2019 Tachiwa ................ H04W 48/14
2020/0036806 A1* 1/2020 Dreher ................ G06F 16/2255

OTHER PUBLICATIONS

"Working with Bluetooth Devices", Retrieved from: https://blog.bluetooth.com/bluetooth-pairing-part-5-legacy-pairing-out-of-band, Jun. 29, 2004, pp. 1-50.

Ren, Kai, "Bluetooth Pairing Part 5—Legacy Pairing—Out of Band", Retrieved from: https://blog.bluetooth.com/bluetooth-pairing-part-5-legacy-pairing-out-of-band, Apr. 7, 2017, 6 Pages.

* cited by examiner

OUT-OF-BAND SERVICE DISCOVERY FOR PERIPHERAL DEVICES

CROSS-REFERENCE TO RELATED APPLICATIONS

N/A

BACKGROUND

Recent years have seen rapid development in communication technology, particularly in the capabilities of electronic devices to communicate with one another over wireless networks. For example, electronic devices often include short-range wireless communication capabilities that enable a variety of devices to communicate with one another over short-range wireless connections. Indeed, many computing devices can pair with or discover a variety of peripheral devices positioned within a proximity of central computing devices to establish connections with and utilize various functionalities provided by the peripheral devices.

Communicating with and interacting with peripheral devices, however, has a number of problems and drawbacks. For example, pairing with and discovering services of peripheral devices often involves a significant number of back and forth communications between devices to establish a secure connection and obtain information that enables an electronic device to effectively communicate with a peripheral device. This exchange of information between devices can become time consuming, particularly with devices having rotating identifiers (e.g., privacy-enabled devices). In addition, as wireless communication grows in popularity, maintaining information that enables communicating with peripheral devices can also consume significant memory and processing resources.

DETAILED DESCRIPTION

Figure 1:
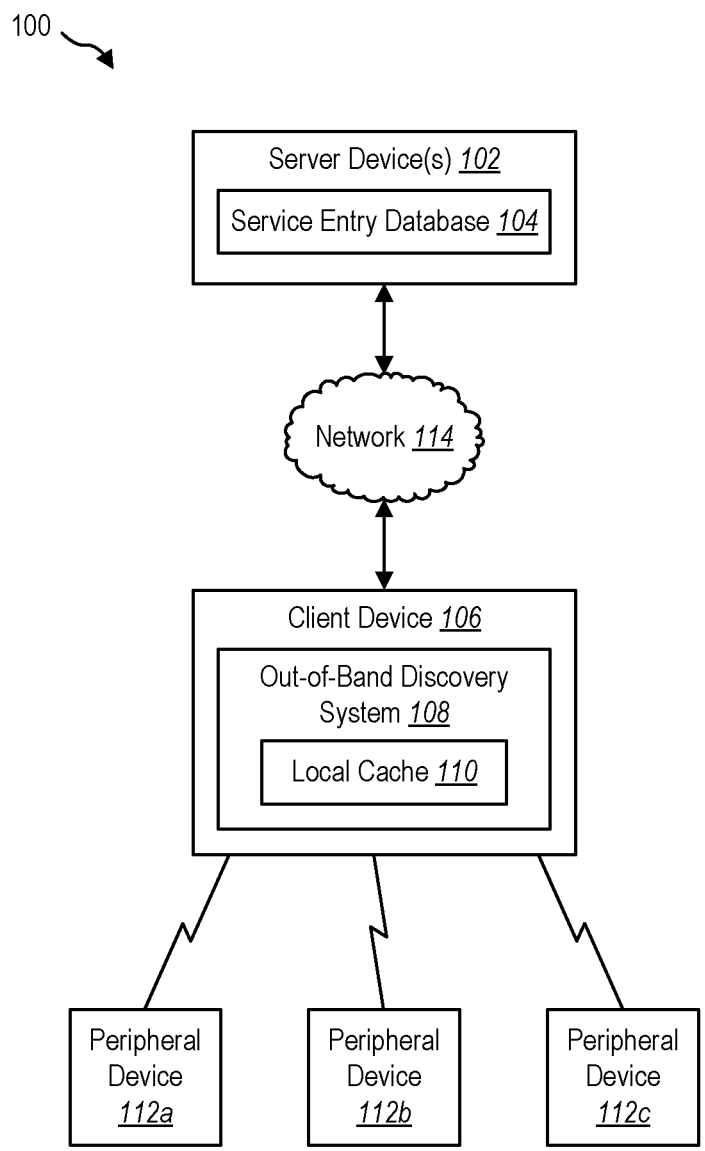
FIG. 1 illustrates an example environment including an out-of-band discovery system for discovering service definitions in accordance with one or more implementations.

The present disclosure generally relates to an out-of-band discovery system implemented in connection with a central computing device (or simply a "central device") to discover information associated with service attributes (e.g., service descriptions) of a peripheral device to enable the central device to communicate with or otherwise interact with the peripheral device. In particular, as will be described in further detail below, the out-of-band discovery system can receive a hash value from a peripheral device representative of service attributes (e.g., services, descriptors, functionalities, other characteristics) of the peripheral device. The out-of-band discovery system can compare the received hash value to other hash values (e.g., hash identifiers) from a local cache and/or remote database (e.g., a service entry database) to identify one or more service definitions associated with service attributes of the peripheral device. Using the service definitions, the computing device can interact directly with the peripheral device via a wireless connection (e.g., a direct connection) between the computing device and peripheral device.

Implementations of the present disclosure provide benefits and/or solve one or more problems associated with discovering information to enable a computing device and peripheral device to effectively communicate. For example, by retrieving and utilizing a hash value to identify a corresponding set of services, the out-of-band discovery system can discover service definitions that enable a computing device to interact directly with a peripheral device without performing an expensive discovery process. Indeed, by performing out-of-band discovery of the service definitions in accordance with one or more implementations described herein, the out-of-band discovery system can significantly reduce a number of back and forth communications between a computing device and peripheral device thereby increasing available processing resources while reducing delays associated with conventional service discovery and device pairing. Where a hash value matches a hash identifier mapped to a corresponding set of service definitions, the out-of-band discovery system can discover service definitions that enable interaction with the peripheral device with only a single request and response between a client device and peripheral device.

In addition, by discovering service definitions associated with respective sets of attributes, the out-of-band discovery system can facilitate communication between a computing device and any number of peripheral devices of the same equivalence class (e.g., peripheral devices having the same set of service attributes). Indeed, as will be discussed in further detail below, the out-of-band discovery system can maintain a local or remote cache of service database entries including hash identifiers and associated service definitions that enable a computing device to interact with multiple peripheral devices of the same equivalence class. Accordingly, rather than performing in-band discovery of service attributes and corresponding service definitions via an expensive service discovery process for every single peripheral device, the out-of-band discovery system can access service definitions via a local cache (or other accessible collection of service database entries) for any peripheral device for which out-of-band discovery has been performed for a similar peripheral device.

Moreover, even where a peripheral device is privacy enabled (e.g., the peripheral device periodically generates random addresses), the out-of-band discovery system can similarly forego conventional service discovery methods in accordance with one or more implementations described herein. In particular, by determining a hash value based on service attributes of a peripheral device, the out-of-band discovery system can perform out-of-band discovery of service definitions notwithstanding a rotating and/or random address for a unique device. Accordingly, where traditional service discovery for a privacy-enabled device may involve re-discovering service attributes and associated definitions with each subsequent attempt to interact with a peripheral device, the out-of-band discovery system may utilize a local cache and/or remote database of service database entries to prevent unnecessary delay and expense of processing resources for respective communication sessions between the computing device and privacy-enabled peripheral device.

As illustrated in the foregoing discussion, the present disclosure utilizes a variety of terms to describe features and advantages of the out-of-band discovery system. Additional detail will now be provided regarding the meaning of such terms. For instance, as used herein, a "peripheral device" refers to an electronic device that serves as an auxiliary device to a central computing device. A peripheral device may refer to any device that provides inputs and/or receives information from a central device. Examples of peripheral devices include a mouse, a keyboard, a digital pen, a portable storage device, a printer, a smart watch, or a variety of Internet of things (IoT) devices. Conversely, a "central computing device" or "central device" may refer to any computing device capable of discovering and communicating with a peripheral device. For example, a central computing device may refer to any client device having a processor thereon that provides commands to a peripheral device or, alternatively, processes inputs received from a peripheral device. In one or more embodiments described herein a central device is referred to as a "client device," which may refer to a mobile device (e.g., a smartphone, a tablet), a desktop computer, or another type of computing device capable of interacting with a peripheral device in accordance with one or more configurations described herein.

As used herein, a "service attribute" refers to any characteristic of a peripheral device. For example, a service attribute may refer to a service or functionality that one or more components of a peripheral device are capable of providing. For instance, service attributes for a temperature sensor may include indicators of discrete functionalities that the temperature sensor provides (e.g., logged temperature measurements, real-time temperature data). Service attributes may further include indications of hardware on a peripheral device. For example, service attributes for a smart watch may include indicators of an accelerometer, global positioning system (GPS) sensor, a gyroscope, a battery, or any other hardware capable of providing functionality to the smart watch that may be accessible to a central computing device. Indeed, peripheral devices may include any number of combinations of functional and hardware characteristics that correspond with respective types and classes of peripheral devices.

As used herein, a "hash value" refers to a determined value for a peripheral device based on a set of service attributes corresponding to the peripheral device. In particular, a hash value may include data representative of service attributes for a corresponding peripheral device. As an example, a hash value may include a unique identifier (e.g., a universally unique identifier (UUID), a globally unique identifier (GUID)), a service declaration value, a service handle identifier, or other data associated with a set of service attributes. As will be discussed in further detail below, an out-of-band discovery system (e.g., implemented on a central device) may retrieve, read, or otherwise access a hash value advertised or exposed by a peripheral device. In addition, while one or more configurations described herein include identifying and utilizing a hash value for performing out-of-band discovery, it will be understood that any service database identifier representative of a unique service database (e.g., service definitions from a service database entry) could be identified in a similar way as described herein in connection with hash values. Accordingly, features and functionality described herein in connection with utilizing a hash value to perform out-of-band discovery may similarly apply to other types of service database identifiers.

A central device may perform out-of-band discovery of service attributes for a peripheral device. As used herein, "out-of-band discovery" refers to discovery of service attribute information (e.g., service definitions) obtained via any communication medium outside an established direct communication (e.g., an in-band communication) between a central device and a peripheral device during a discovery period. For example, upon retrieving a hash value from a peripheral device, the out-of-band discovery system can perform discovery of service definitions for the peripheral device by accessing a local cache, a remote storage on a cloud computing system, or discovery source other than via an in-band communication network between the central device and peripheral device used to retrieve the hash value from the peripheral device. Additional detail with regard to performing out-of-band discovery based on a hash value for a corresponding peripheral device will be discussed in further detail below.

As used herein, "service definitions" or "service databases" may refer to any information (e.g., from a service database entry) associated with one or more service attributes that enables a central device to interact with a peripheral device in a variety of ways. Indeed, service definitions may include any information that enables a central device to communicate information in such a way that the peripheral device is capable of understanding to actuate a respective function or cause the peripheral device to provide data to the central device or other computing device. In various examples described herein, the service definitions may be included within a service database entry and mapped to a corresponding hash value.

As will be discussed below, upon performing out-of-band discovery to identify service definitions associated with a service attribute for a peripheral device, a central device may interact with the peripheral device by communicating directly with the peripheral device to activate specific functions of the peripheral device, provide an input or output to the peripheral device, receive an input or output from the peripheral device, or otherwise interact with the peripheral device in accordance with a set of service definitions. In one or more implementations, the central device interacts with the peripheral device by establishing an ad hoc connection (e.g., a temporary computer-to-computer wireless connection) between the central device and the peripheral device without connecting via an intermediate access point or router.

Additional detail will now be provided regarding the out-of-band discovery system in relation to illustrative figures portraying example implementations. For example, FIG. 1 illustrates an example environment 100 for performing out-of-band discovery of service definitions for a peripheral device. As shown in FIG. 1, the environment 100 includes one or more server device(s) 102 including a service entry database 104. As will be discussed in further detail below, the service entry database 104 includes database entries having information associated with sets of service attributes representative of corresponding peripheral devices. The server device(s) 102 may include one or multiple devices of a cloud computing system or other distributed network of computing resources and services.

The environment 100 further includes a client device 106 having an out-of-band discovery system 108 implemented thereon. The out-of-band discovery system 108 may additionally include a local cache 110. As will be discussed in further detail below, the local cache 110 includes a number of service database entries similar to at least a subset of entries from the service entry database 104 on the server device(s) 102. The client device 106 may refer to any computing device having a processor thereon and capable of acting as a central device to one or multiple peripheral devices. Indeed, the client device 106 may refer to various types of computing devices including, by way of example, a mobile device (e.g., a smartphone, a tablet), a desktop computer, or another type of computing device.

As shown in FIG. 1, the client device 106 acts as a central device for a plurality of peripheral devices 112*a-c*. The peripheral devices 112*a-c* may be all be the same class of peripheral device or may each be different equivalence classes of peripheral devices (e.g., peripheral devices having similar or different sets of service attributes). In addition, the peripheral devices 112*a-c* may be located within a proximity of the client device 106 to enable direct communication between the client device 106 and peripheral devices 112*a-c* via a short range wireless network. The client device 106 and peripheral devices 112*a-c* may communicate via respective in-band connections. For example, the client device 106 may communicate with a first peripheral device 112*a* via a first in-band connection. The client device 106 may additionally communicate with a second peripheral device 112*b* and third peripheral 112*c* device via second and third in-band connections, respectively. The in-band connections may refer to any type of short-range and/or direct wireless connection between the client device 106 and peripheral devices 112*a-c*.

Although FIG. 1 illustrates a particular number and arrangement of the server device(s) 102, client device 106, and peripheral devices 112*a-c*, it will be understood that the environment 100 may include any number of devices, including one or more server devices on the same or different cloud computing system, one or multiple client devices capable of acting as central computing devices to the peripheral devices 112*a-c*, and any number and variety of peripheral devices.

As shown in FIG. 1, the client device 106 and server device(s) 102 may communicate over a network 114. The network 114 may include one or multiple networks that use one or more communication protocols or technologies for transmitting data. For example, the network 114 may include the Internet or another data link that enables transport of electronic data between the client device 106 and server device(s) 102.

As mentioned above, and as will be discussed in further detail below, the out-of-band discovery system 108 may perform out-of-band discovery of service definitions to enable the client device 106 to interact with one or more of the peripheral devices 112*a-c*. As an example, the out-of-band discovery system 108 may retrieve, read, or otherwise access a hash value for the first peripheral device 112*a* representative of a set of service attributes that describe features and functionality of the first peripheral device 112*a*. The client device 106 can receive the hash value from the first peripheral device 112*a* via an in-band connection between the client device 106 and first peripheral device 112*a*.

As mentioned above, and as shown in FIG. 1, the service device(s) 102 includes a service entry database 104 including information associated with respective sets of service attributes for a variety of peripheral devices. For example, as will be discussed in further detail below, the service entry database 104 may include service database entries for sets of service attributes corresponding to each of the peripheral devices 110*a-c*. Indeed, the service entry database 104 may include service database entries for any combination of service attributes corresponding to any number of known peripheral devices. While FIG. 1 shows an example in which the service entry database 104 is implemented on the server device(s), in one or more embodiments, the service entry database 104 is implemented in whole or in part on the client device 106 or collectively between multiple devices.

As shown in FIG. 1, the out-of-band discovery system 108 includes a local cache 110 that also includes information associated with respective sets of service attributes for one or more peripheral devices. In one or more examples, the local cache 110 includes a set of service database entries associated with peripheral devices corresponding to a user account and/or representative of a set of peripheral devices with which the client device 106 has recently interacted. The local cache 110 may include a most recently used cache representative of a set of peripheral devices with which the client device 106 frequently interacts and/or representative of a set of peripheral devices with which the client device 106 has recently interacted. As will be discussed in further detail below, the local cache 110 may include a set of service database entries that make up a subset of a larger collection of service database entries within the service entry database 104 on the server device(s) 102.

As will be discussed in further detail below, the out-of-band discovery system 108 can perform an out-of-band discovery process that involves obtaining information from the service entry database 104 to enable the client device 106 to communicate with or otherwise interact with one or multiple peripheral devices 110*a-c*. For example, based on a hash value for the first peripheral device 112*a*, the out-of-band discovery system 108 can identify a corresponding entry from the service entry database 104 having a matching hash value. The corresponding entry may additionally include service definitions that provide information to enable the client device 106 to interact with the peripheral device 112*a* in a number of prescribed ways. For example, upon identifying service definitions for the peripheral device 112*a*, the client device 106 can provide commands or instructions in a particular format (e.g., based on the service definitions) that activate functions of the peripheral device 112*a* or otherwise provides instructions that hardware and/or software on the peripheral device 112*a* is configured to interpret and process.

Figure 2:
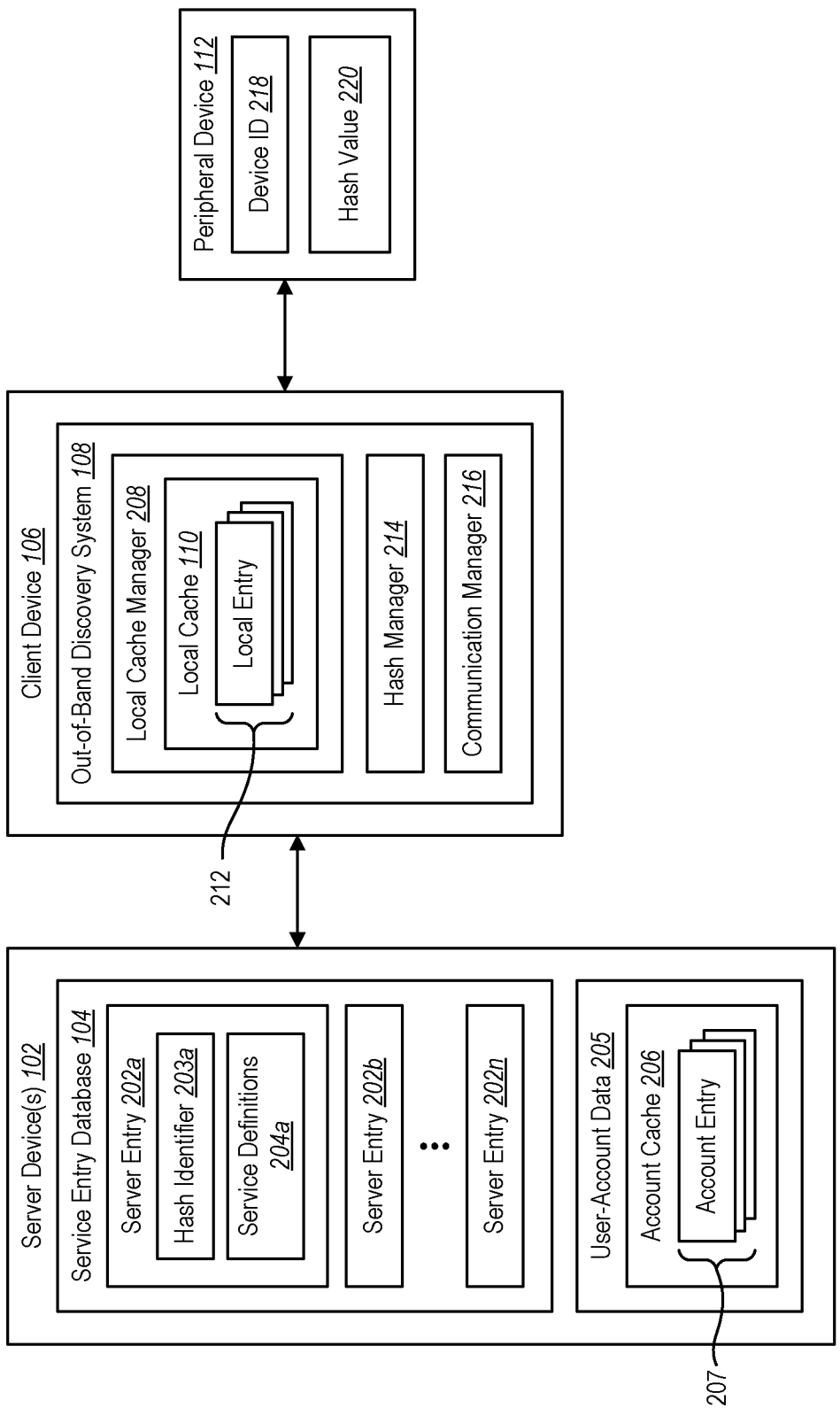
FIG. 2 is an example framework for performing out-of-band discovery of service definitions for a peripheral device having a set of service attributes in accordance with one or more implementations.

Additional detail with regard to performing out-of-band discovery of service attribute information for a peripheral device will be described in connection with FIG. 2. The illustrated example shows an example server device(s) 102, a client device 106, and a peripheral device 112 including similar features as discussed above in connection with FIG. 1. For example, as shown in FIG. 2, the server device(s) 102 includes a service entry database 104 thereon while the client device 106 includes the out-of-band discovery system 108 and local cache 110 implemented thereon.

The service entry database 104 on the server device(s) 102 may include any number of service database entries (e.g., server entries 202a-202n) corresponding to sets of service attributes for various peripheral devices. As shown in FIG. 2, a first entry 202a of the service entry database 104 includes a hash identifier 203a (e.g., a hash value) and a corresponding set of service definitions 204a. Each of the additional server entries 202b-n may similarly include a unique hash identifier and a set of one or more service definitions corresponding to one or more service attributes. The service definitions for each hash identifier may correspond to a discrete set of service attributes for a known peripheral device. Accordingly, the service entry database 104 may include entries having a hash value and corresponding service definitions for each known type of peripheral device associated with a respective set of service attributes.

The server device(s) 102 may additionally include user-account data 205 including user-account information corresponding to a user of the client device 106. For example, the user-account data 205 may include information about an individual as well as information about one or more devices (e.g., client devices, peripheral devices) that the individual has registered with a user account. In one or more embodiments, the user-account data 205 includes an account cache 206 including a set of service database entries (e.g., account entries 207) corresponding to peripheral devices registered to or otherwise associated with the user account.

The account entries 207 of the account cache 206 may include a subset of a larger collection of server entries 202a-n within the service entry database 104. For example, where the service entry database 104 includes server entries 202a-n corresponding to each peripheral device from a collection of known peripheral devices, the account entries 207 of the account cache 206 may refer to a subset of the server entries 202a-n representative of a smaller collection or subset of known peripheral devices associated with a user account. The subset of peripheral devices may represent a set of peripheral devices that have been registered by a user associated with a user account. The subset of peripheral devices may represent a set of peripheral devices with which the client device 106 (and/or other device(s) associated with the user account) has previously connected or interacted. In one or more implementations, the subset of peripheral devices identified within the account cache 206 includes account entries 207 for a set of commonly used peripheral devices based on data from other user accounts (e.g., a set of the ten most used peripheral devices by other users).

In one or more embodiments, the out-of-band discovery system 108 can perform out-of-band discovery by obtaining (e.g., downloading) service definitions from the service entry database 104. Alternatively, the out-of-band discovery system 108 may perform out-of-band discovery by obtaining service definitions from the user-account data 205. Additional detail with regard to obtaining service definitions stored on the server device(s) 102 is described below (e.g., in connection with examples illustrated in FIGS. 3-5).

As mentioned above, the client device 106 may include the out-of-band discovery system 108 implemented thereon. The out-of-band discovery system 108 may include a local cache manager 208 that manages a local cache 110 (e.g., a most recently used cache) for the client device 106. In particular, local cache manager 208 may generate and locally store a set of service database entries (e.g., local entries 212) corresponding to one or more service database entries stored on the server device 102 for peripheral devices with which the client device 106 has recently connected.

Similar to the service database entries stored on the server device(s) 102, the local entries 212 may include hash identifiers and associated service definitions including information that enables the client device 106 to interact with select peripheral devices.

The out-of-band discovery system 108 can compile the local cache 110 in a number of ways. For example, the local cache manager 208 may perform a bulk download of service database entries (e.g., account entries 207, server entries 202a-n) from the user-account data 205 or service entry database 104 prior to communicating with or performing out-of-band discovery for a peripheral device. In addition, the local cache manager 208 may dynamically update the local cache 110 in response to performing discovery (e.g., in-band or out-of-band discovery) for a peripheral device. Additional detail in connection with generating and updating a local cache 110 is provided in connection with example embodiments illustrated in FIGS. 3-5 below.

As shown in FIG. 2, the out-of-band discovery system 108 additionally includes a hash manager 214 and a communication manager 216. In one or more embodiments, the hash manager 214 and communication manager 216 cooperatively collect information (e.g., a device identifier 218 and hash value 220) from the peripheral device 112 and determine if the hash value 220 for the peripheral device 112 matches a hash identifier from an entry of the local cache 110 (or alternatively, the account cache 206 or service entry database 104). As an example, the communication manager 216 may retrieve a hash value 220 representative of capabilities, services, and other attributes of the peripheral device 112. This information may initially be gathered via an in-band connection or other communication network over which the client device 106 and the peripheral device 112 may communicate. In one or more implementations, the peripheral device 112 advertises or broadcasts device information including the device identifier 218 and hash value 220 that the communication manager 216 retrieves.

As shown in FIG. 2, the peripheral device 112 includes a device identifier 218, which may include a unique identifier of the peripheral device 112 (e.g., an address of the peripheral device 112). In one or more embodiments, the out-of-band discovery system 108 receives the device identifier 218 to determine if out-of-band discovery is necessary for a given peripheral device. As an example, where the device identifier 218 is static (e.g., unchanging), the out-of-band discovery system 108 may identify that the client device 106 has previously paired with the peripheral device 112 and utilize previous credentials and discovery data stored on the client device 106 (e.g., within the local cache 110) to pair with, discover, or otherwise interact with the peripheral device 112.

Where the peripheral device 112 is a privacy-enabled device that periodically generates a random identifier (e.g., a rotating device identifier) or other unique identifier of the peripheral device 112, the out-of-band discovery system 108 (e.g., the communication manager 216) may retrieve the hash value 220 and perform out-of-band discovery in accordance with one or more embodiments described herein. For example, as will be discussed in connection with FIG. 5 below, the out-of-band discovery system 108 may fail to recognize the device identifier 218 and perform out-of-band discovery based on a determination that the peripheral device 112 is privacy enabled. In particular, the out-of-band discovery system 108 may perform out-of-band discovery based on a failure to recognize the device identifier 218, even where the client device 106 and peripheral device 112 may have previously connected or interacted (e.g., when a previous iteration of the device identifier 218 was assigned to the peripheral device 112).

Upon retrieving the hash value 220 for the peripheral device 112, the out-of-band discovery system 108 can perform out-of-band discovery in a variety of ways. As a first example, the hash manager 214 can query a local cache 110 on the client device 106 to determine whether a hash identifier for a local entry on the local cache 110 matches the hash value calculated for the peripheral device. If the local cache 110 includes a local entry having a hash identifier that matches the received hash value 220 (e.g., a cache hit), the out-of-band discovery system 108 can obtain or otherwise identify service definitions from the local entry to use in interacting with the peripheral device 112.

As another example, the hash manager 214 may access user-account data 205 to determine whether the account cache 206 includes an account entry having a hash identifier that matches the hash value 220 received from the peripheral device 112. If the account cache 206 includes an entry having a hash identifier that matches the hash value 220 for the peripheral device 112, the out-of-band discovery system 108 can download or otherwise access service definitions from the account entry having the matching hash identifier. The out-of-band discovery system 108 can utilize the service definitions to interact with the peripheral device 112. In one or more implementations, the out-of-band discovery system 108 updates the local cache 110 to include a local entry including the service definitions and associated hash identifier. In this way, when the out-of-band discovery system 108 subsequently performs out-of-band discovery for the peripheral device 112 (or other peripheral device having a matching hash value), the out-of-band discovery system 108 can access a local entry rather than remotely accessing a service database entry from the account cache 206.

As a further example, the hash manager 214 may access the service entry database 104 including a full listing of server entries for known sets of service attributes corresponding to known peripheral devices. Upon retrieving the hash value, the hash manager 214 can query or otherwise obtain access to the service entry database 104 to determine whether a remote entry from the service entry database 104 includes a hash identifier that matches the received hash value 220 for the peripheral device 112. If the hash manager 214 identifies a remote entry including a matching hash identifier, the out-of-band discovery system 108 can download or otherwise access the service definitions from the remote entry to use in interacting with the peripheral device 112. In one or more implementations, the out-of-band discovery system 108 can update the local cache 110 to include a new local entry including the service definitions and associated hash identifier (e.g., for use in subsequently performing out-of-band discovery for the peripheral device 112 or other peripheral devices having the same set of service attributes).

In one or more embodiments, the out-of-band discovery system 108 performs out-of-band discovery by querying one or multiple collections of service database entries between the client device 106 and server device(s) 102. For example, the hash manager 214 can initially query the local cache 110 on the client device 106. If the hash manager 214 fails to identify a local database entry having a hash identifier that matches the hash value 220 (e.g., a cache miss), the hash manager 214 can query the user-account data 205 to determine whether an account cache includes an account database entry corresponding to the hash value. If the account cache 206 includes a matching entry, the client device 106 can download the account entry to include within the local cache 110. Alternatively, upon determining that the local cache 110 and/or account cache 206 does not include a matching entry, the hash manager 214 can query the service entry database 104 including a full listing of server entries corresponding to a full collection of known peripheral devices.

If the out-of-band discovery system 108 is unable to identify an entry that matches the hash value for the peripheral device 112 (e.g., from any of the collections described herein), the out-of-band discovery system 108 can forego out-of-band discovery and facilitate an in-band discovery or traditional pairing between the client device 106 and peripheral device 112. For example, rather than obtaining service definitions using one of the out-of-band processes described herein, the out-of-band discovery system 108 can instead perform a traditional or conventional in-band discovery process between the client device 106 and peripheral device 112 where the client device 106 iteratively obtains service definitions via a back-and-forth process between the client device 106 and peripheral device 112. Upon completing discovery of service definitions for the peripheral device 112, the out-of-band discovery system 108 can update the local cache 110 to include a new entry for the peripheral device including the hash value and corresponding service definitions to use in facilitating future interactions with the peripheral device 112. In one or more implementations, the out-of-band discovery system 108 provides information from the entry to the server device 102 for inclusion within the account cache 206 and/or service entry database 104.

In one or more embodiments, the out-of-band discovery system 108 performs in-band or out-of-band discovery of the service definitions for the peripheral device 112 based on a predicted time that it would take to perform either in-band discovery or out-of-band discovery in accordance with one or more embodiments described herein. For example, the out-of-band discovery system 108 may determine a first duration of time corresponding to a predicted period of time that it would take to interact directly with the peripheral device 112 and obtain service definitions for a set of service attributes. The out-of-band discovery system 108 may additionally determine a second duration of time corresponding to a predicted period of time that it would take to retrieve a hash value and access associated service definitions from an out-of-band source (e.g., the local cache 110, the account cache 206, or the service entry database 104). Based on the predicted time periods, the out-of-band discovery system 108 may determine to perform a corresponding discovery process.

While some embodiments described herein involve a faster out-of-band discovery process than traditional in-band discovery or pairing, unreliable networking conditions or other factors may result in performing in-band discovery as an alternative to performing out-of-band discovery. Nevertheless, by updating a local cache 110 to include a local database entry corresponding to a recently discovered peripheral device 112, the out-of-band discovery system 108 can reduce an amount of time needed to perform subsequent discovery of service definitions, particularly where a peripheral device 112 is a privacy-enabled device having a rotating or randomized device identifier 218. Therefore, even where network conditions prevent the out-of-band discovery system 108 from accessing the service entry database 104, the out-of-band discovery system 108 may nonetheless forego traditional in-band discovery processes in many implementations.

In one or more embodiments, the out-of-band discovery system 108 performs out-of-band discovery of one or more service definitions as part of a traditional pairing or in-band discovery process. For example, in one or more embodiments, the out-of-band discovery system 108 pre-pairs or establishes a connection with the peripheral device 112 to authenticate or establish a trusted connection between the client device 106 and peripheral device 112. Establishing the connection may involve authenticating one or more credentials between the client device 106 and peripheral device 112. Rather than requesting and communicating service definitions via the established in-band connection, the out-of-band discovery system 108 may instead perform out-of-band discovery by querying the local cache 110, account cache 206, or service entry database 104 in accordance with one or more examples described herein. In this way, the out-of-band discovery system 108 can forego at least portions of an expensive and time-consuming discovery process that involves extensive back and forth communications between the client device 106 and peripheral device 112.

As shown in FIG. 2, components 208-216 of the out-of-band discovery system 108 are implemented on a client device. Alternatively, one or more of the components 208-216 may be implemented wholly or partially on one or more additional devices (e.g., the server device(s) 102 or another client device that cooperatively performs out-of-band discovery of service definitions for the peripheral device 112). In addition, the components 208-216 of the out-of-band discovery system 108 can include software, hardware, or a combination of both. The components 208-216 can include one or more instructions stored on a computer-readable storage medium and executable by processors of one or more computing devices. When executed by the one or more processors, the computer-executable instructions of the out-of-band discovery system 108 can cause the client device 106 and/or server device(s) 102 to perform one or more methods or series of acts described herein (e.g., in connection with FIGS. 7 and 8 described below). Alternatively, the components 208-216 of the out-of-band discovery system 108 can comprise hardware, such as a special-purpose processing device, to perform a certain function or group of functions. The components 208-216 of the out-of-band discovery system 108 can also include a combination of computer-executable instructions and hardware.

FIGS. 3-6 provide examples in which an out-of-band discovery system 108 can determine a hash value for a peripheral device and perform out-of-band discovery of service definitions to enable interacting with the peripheral device. In particular, FIGS. 3-6 are provided by way of example to illustrate features and functionality provided by the out-of-band discovery system 108 in a number of different environments and are not intended to be limited of a specific embodiment or environment. For example, features and functionality described in connection with retrieving a hash value for a peripheral device and performing out-of-band discovery of service definitions based on the hash value in accordance with an example illustrated by one of the figures may similarly apply to one or more additional implementations described in connection with another figure.

Figure 3:
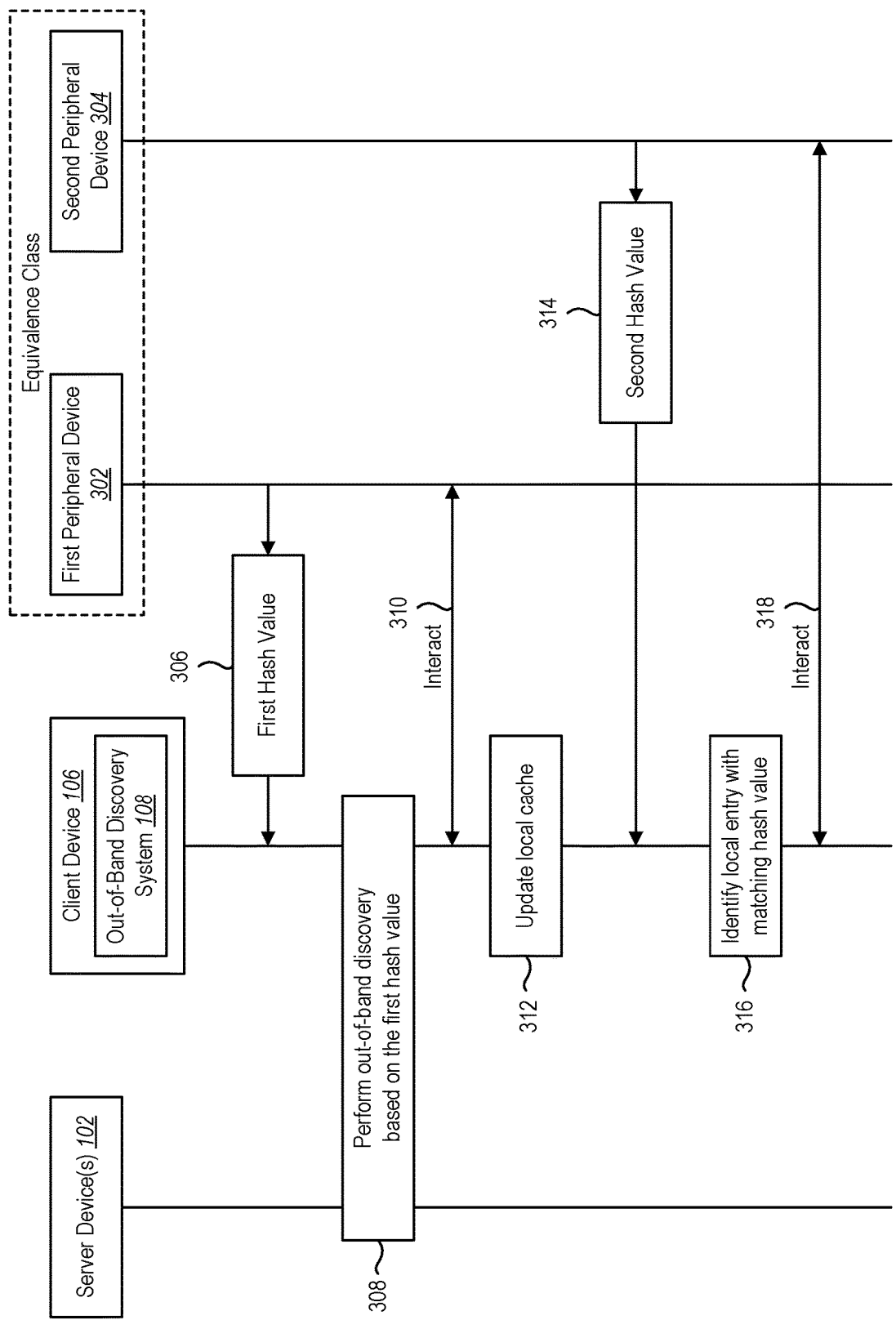
FIG. 3 illustrates an example implementation of performing out-of-band discovery of service definitions for peripheral devices.

FIG. 3 illustrates an example implementation in which an out-of-band discovery system 108 performs out-of-band discovery based on discovery of service definitions for another peripheral device of the same equivalence class. In particular, FIG. 3 illustrates an environment in which an out-of-band discovery system 108 performs discovery for peripheral devices 302-304 of the same equivalence class (e.g., peripheral devices having the same set of service attributes) and dynamically updates a local cache (e.g., the local cache 110) to include a local entry including a hash and corresponding service definitions that enable the client device 106 to interact with each of the respective peripheral devices 302-304.

As shown in FIG. 3, a first peripheral device 302 performs an act 306 of providing a first hash value to the client device 106. The first peripheral device 302 may provide the hash value over an in-band connection or other network over which the client device 106 and first peripheral device 302 may communicate. In one or more implementations, the first peripheral device 302 provides the hash value to the client device 106 in response to a request from the client device 106. In one or more embodiments, the first peripheral device 302 advertises or exposes the first hash value in such a way that enables the client device 106 to read or otherwise access the first hash value directly from the first peripheral device 302.

The out-of-band discovery system 108 can utilize the first hash value received from the first peripheral device 302 to perform an act 308 of out-of-band discovery based on the hash value. For example, the out-of-band discovery system 108 can query a local cache 110 on the client device 106 to determine whether a service database entry of the local cache 110 includes a hash identifier that matches the hash value for the first peripheral device 302. As another example, the out-of-band discovery system 108 can query an account cache 206 from a user account to determine whether a service database entry of the account cache 206 has a hash identifier that matches the hash value. As another example, the out-of-band discovery system 108 can query a service entry database 104 to determine whether a service database entry from the service entry database 104 has a hash identifier that matches the hash value.

In accordance with one or more examples discussed above, the out-of-band discovery system 108 can perform out-of-band discovery by querying multiple sources of service database entries. For instance, the out-of-band discovery system 108 may first query the local cache 110. If the out-of-band discovery system 108 fails to identify a local entry having a matching hash identifier to the first hash value (e.g., a cache miss), the out-of-band discovery system 108 can query an account cache 206 and/or the service entry database 104 on the server device(s) 102.

Upon identifying a service database entry having the first hash value, the out-of-band discovery system 108 can identify or otherwise access service definitions that enable the client device 106 to interact with the first peripheral device 302. As shown in FIG. 3, client device 106 can perform an act 310 of interacting with the first peripheral device 302 in accordance with the service definitions corresponding to the first peripheral device 302. Indeed, based on the service definitions, the client device 106 and first peripheral device 302 can interact in a number of ways, as discussed above.

As shown in FIG. 3, the out-of-band discovery system 108 can perform an act 312 of updating the local cache 110 to include a local entry for the first peripheral device 302. In particular, the out-of-band discovery system 108 can add a new local entry (or update an existing entry) that includes the first hash value corresponding to the set of service attributes for the first peripheral device and mapped to a set of service definitions for the first peripheral device. Because the service definitions are associated with a hash identifier that is unique to a set of service attributes, the out-of-band discovery system 108 can utilize the local entry to discover service definitions for any other peripheral device of the same equivalence class as the first peripheral device 302.

Indeed, as shown in FIG. 3, the second peripheral device 304 of the same equivalence class as the first peripheral device 302 can perform an act 314 of providing a second hash value descriptive of service attributes provided by the second peripheral device 304 to the client device 106. The act 314 of providing the service attribute data to the client device 106 may be similar to the act 306 of the first peripheral device 302 providing service attribute data to the client device 106. In addition, because the first peripheral device 302 and the second peripheral device 304 share a matching set of service attributes, the second hash value and the first hash value will have matching values.

The out-of-band discovery system 108 can perform an act 316 of identifying the local entry with a matching hash value corresponding to the first peripheral device 302. In particular, because the second hash value for the second peripheral device 304 is the same as the first hash value for the first peripheral device 302 (e.g., based on the peripheral devices 302-304 being of the same equivalence class), the out-of-band discovery system 108 may identify the local entry added to the local cache 110 corresponding to the service database entry discovered for the first peripheral device 302. The out-of-band discovery system 108 may therefore discover the same set of service definitions for interacting with the second peripheral device 304 as used for interacting with the first peripheral device 302. As shown in FIG. 3, the client device 106 can perform an act 318 of interacting with the second peripheral device 304 similar to the act 312 of interacting with the first peripheral device 302.

Figure 4:
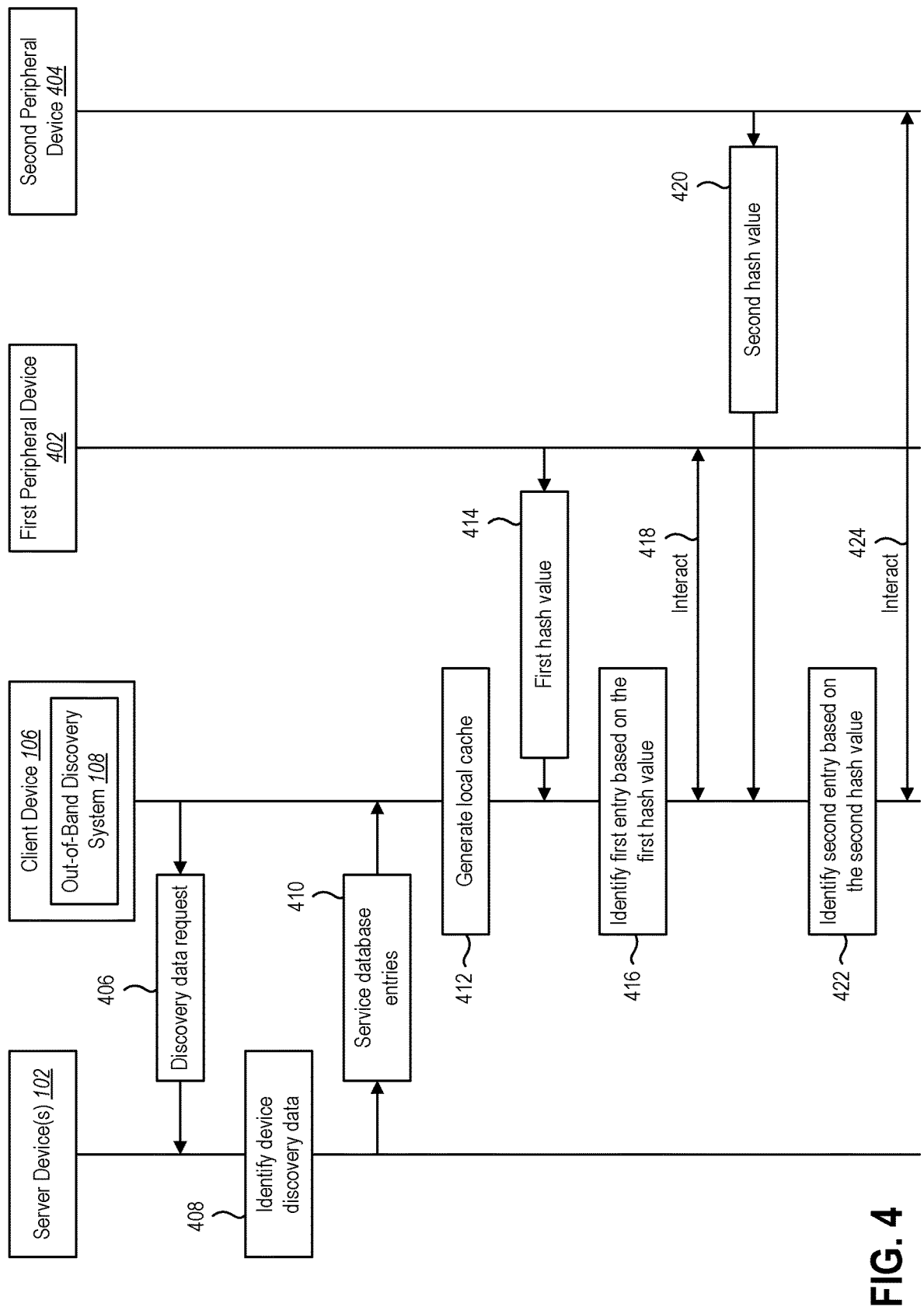
FIG. 4 illustrates another example implementation of performing out-of-band discovery of service definitions for peripheral devices.

FIG. 4 illustrates another example implementation in which the out-of-band discovery system 108 performs out-of-band discovery based on a download of discovery data from the server device(s) 102 (e.g., a cloud-computing system). In particular, FIG. 4 illustrates an environment including one or more server device(s) 102 and a client device 106 having an out-of-band discovery system 108 thereon that generates a local cache on a storage of a client device 106 for use in performing out-of-band discovery for a plurality of peripheral devices 402-404 of different equivalence classes (e.g., peripheral devices having different sets of service attributes).

As shown in FIG. 4, the client device 106 can perform an act 406 of providing a discovery data request to the server device(s) 102. The discovery data request may include a request for discovery information including service database entries corresponding to one or more known peripheral devices. For example, the request may include a request for commonly used peripheral devices or peripheral devices associated with a specific user account. Alternatively, the client device 106 may generate and provide the request in response to anticipating discovery of a new peripheral device (e.g., based on a recent purchase or a communication received from another central device associated with a user of the client device 106).

In response to receiving the request, the server device(s) 102 can perform an act 408 of identifying device discovery data. Identifying device discovery data may include identifying a set of service database entries corresponding to one or more peripheral devices associated with a user account. As another example, identifying discovery data may include identifying a set of service database entries corresponding to a list of common peripheral devices. In one or more implementations, identifying discovery data may include identifying a service database entry for a new peripheral device (e.g., a new peripheral device registered to a user account or to a larger collection of known peripheral devices). Identifying discovery data may further include identifying a service database entry corresponding to one or more peripheral devices specifically identified within the request received from the client device 106.

As shown in FIG. 4, the server device(s) 102 can perform an act 410 of providing service database entries to the client device 106. The service database entries may include hash identifiers and corresponding service definitions that enable the client device 106 to interact with corresponding peripheral devices (e.g., peripheral devices 402-404). The client device 106 may download one or multiple files from the server device(s) 102 including the service database entries.

Upon receiving the service database entries, the out-of-band discovery system 108 can perform an act 412 of generating (or updating) a local cache of local service database entries. For example, similar to the local cache 110 discussed above in connection with FIG. 2, the out-of-band discovery system 108 can generate a local cache including the downloaded service database entries including hash identifiers and associated service definitions stored on the client device 106. In one or more embodiments, rather than generating a new local cache, the out-of-band discovery system 108 can update an existing cache (e.g., a local cache 110) on the client device 106 to include any service database entries not previously stored on the existing local cache of the client device 106.

As further shown in FIG. 4, the first peripheral device 402 can perform an act 414 of providing a first hash value to the client device 106. The first peripheral device 402 can provide the first hash value over an in-band connection or other direct connection between the first peripheral device 402 and the client device 106.

Based on the first hash value, the out-of-band discovery system 108 can perform an act 416 of identifying a first service database entry within the local cache. In particular, the out-of-band discovery system 108 can identify a first service database entry from the local cache having a hash identifier that matches the generated hash value for the first peripheral device 402.

Similar to one or more embodiments described above, the out-of-band discovery system 108 can extract or otherwise identify service definitions from the first service database entry that enable the client device 106 to interact with the first peripheral device 402. Upon identifying the service definitions, the client device 106 can perform an act 418 of interacting with the first peripheral device 402 in accordance with the service definitions (e.g., instructions included within the service definitions). The client device 106 and first peripheral device 402 can interact in a number of ways, as discussed above.

As shown in FIG. 4, the second peripheral device 404 can perform an act 420 of providing a second hash value to the client device 106. Upon receiving the second hash value, the out-of-band discovery system 108 can perform an act 422 of identifying a second service database entry having a hash identifier that matches the second hash value. Based on service definitions included within the second service database entry, the client device 106 can perform an act 424 of interacting with the second peripheral device 404. The acts 420-424 associated with discovering service definitions and interacting with the second peripheral device 404 may be similar to the acts 414-418 associated with discovering service definitions and interacting with the first peripheral device 402 discussed above.

In addition, because the first peripheral device 402 and the second peripheral device 404 belong to different classes of devices (e.g., different equivalence classes corresponding to different sets of service attributes), it will be understood that the first and second hash values include different values associated with different sets of service attributes corresponding to the respective peripheral devices 402-404. This is in contrast to the example discussed above in connection with FIG. 3 where the peripheral devices 302-304 belonged to the same equivalence class and had similar sets of service attributes (and therefore similar hash values).

Figure 5:
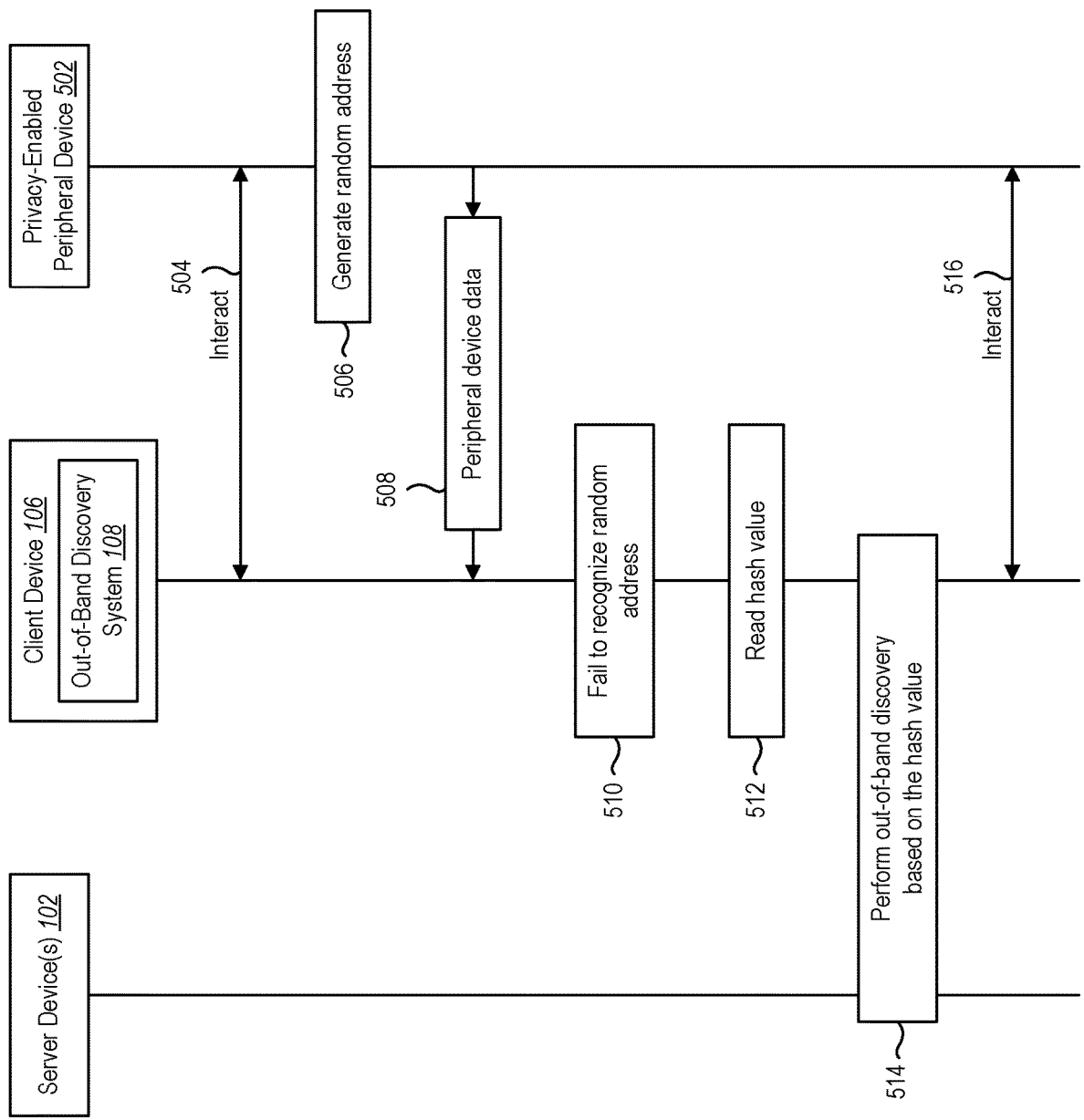
FIG. 5 illustrates an example implementation of performing out-of-band discovery of service definitions for a peripheral device having a rotating identifier.

FIG. 5 illustrates another example implementation in which the out-of-band discovery system 108 performs out-of-band discovery for a privacy-enabled peripheral device 502 (or simply "peripheral device 502"). In particular, FIG. 5 illustrates an environment including one or more server device(s) 102 and a client device 106 including an out-of-band discovery system 108 that performs out-of-band discovery for a peripheral device 502 that periodically generates a random address to prevent unauthorized central computing devices from pairing with the peripheral device 502.

As shown in FIG. 5, the client device 106 can perform an act 504 of interacting with the peripheral device 502. This instance of interacting with the peripheral device 502 may include a conventional pairing or service discovery between the client device 106 and peripheral device 502 where the client device 106 and peripheral device 502 exchange information and/or establish a secure connection in which the client device 106 acts as a central device to the peripheral device 502. In one or more embodiments, the act 504 of interacting with the peripheral device 502 involves an out-of-band discovery of the service definitions to enable the client device 106 to interact with the peripheral device 502 in accordance with other examples described herein.

As shown in FIG. 5, the peripheral device 502 may perform an act 506 of generating a random address (or other random identifier for the peripheral device (502). Indeed, because the peripheral device 502 is privacy enabled, the peripheral device 502 may periodically update or generate a random device address (e.g., every 30 seconds). As a result, the client device 106 and other computing devices may fail to recognize the peripheral device 502 based on a current address for the peripheral device 502.

For example, peripheral device 502 may perform an act 508 of providing peripheral device information to the client device 106. For example, the peripheral device 502 may advertise or expose peripheral device information including a random address or other device identifier in addition to a hash value associated with a set of attributes of the peripheral device 502. Because the current random address is different from a previously assigned address associated with previous interactions between the client device 106 and the peripheral device 502, the out-of-band discovery system 108 may perform an act 510 of failing to recognize the current random address. In response to failing to recognize the address, the out-of-band discovery system 108 may treat the peripheral device as a new device with which the client device 106 has not previously interacted. In one or more embodiments, the out-of-band discovery system 108 may determine or infer that the peripheral device 502 is privacy enabled based on determining that an address for the peripheral device does not match one or more previously identified addresses corresponding to one or more previously discovered (or paired) peripheral devices.

Based on a failure to recognize the current address (or other device identifier) for the peripheral device 502, the client device 106 may perform an act 512 of reading a hash value received in conjunction with the peripheral device data. In one or more embodiments, the client device 106 reads the hash value directly from the peripheral device 502. Alternatively, the client device 106 may receive and store the hash value for comparison with hash identifiers of a local cache.

Using the hash value, the out-of-band discovery system 108 (and/or server device(s) 102) can perform an act 514 of performing out-of-band discovery based on the retrieved hash value. For example, the out-of-band discovery system 108 can query a local cache, an account cache, and/or a service entry database to identify a service database entry including a hash identifier that matches the generated hash value for the peripheral device 502. The act 514 of performing out-of-band discovery may be similar to acts of performing out-of-band discovery discussed above in connection with previous figures. Furthermore, similar to one or more acts discussed above, the out-of-band discovery system 108 can utilize service definitions from an identified service database entry to perform an act 516 of interacting with the peripheral device 502.

Indeed, where conventional pairing systems would perform a new pairing process involving a significant number of back and forth communications between the client device 106 and privacy-enabled peripheral device 502 upon detecting that the peripheral device 502 is privacy enabled, the out-of-band discovery system 108 facilitates out-of-band discovery and interaction between the client device 106 and peripheral device 502 based on service attribute characteristics of the peripheral device 502. Accordingly, the out-of-band discovery system 108 can circumvent performing a new discovery process with the peripheral device 502 at subsequent interactions by generating a hash value and performing out-of-band discovery of service definitions in accordance with one or more embodiments described herein.

Figure 6:
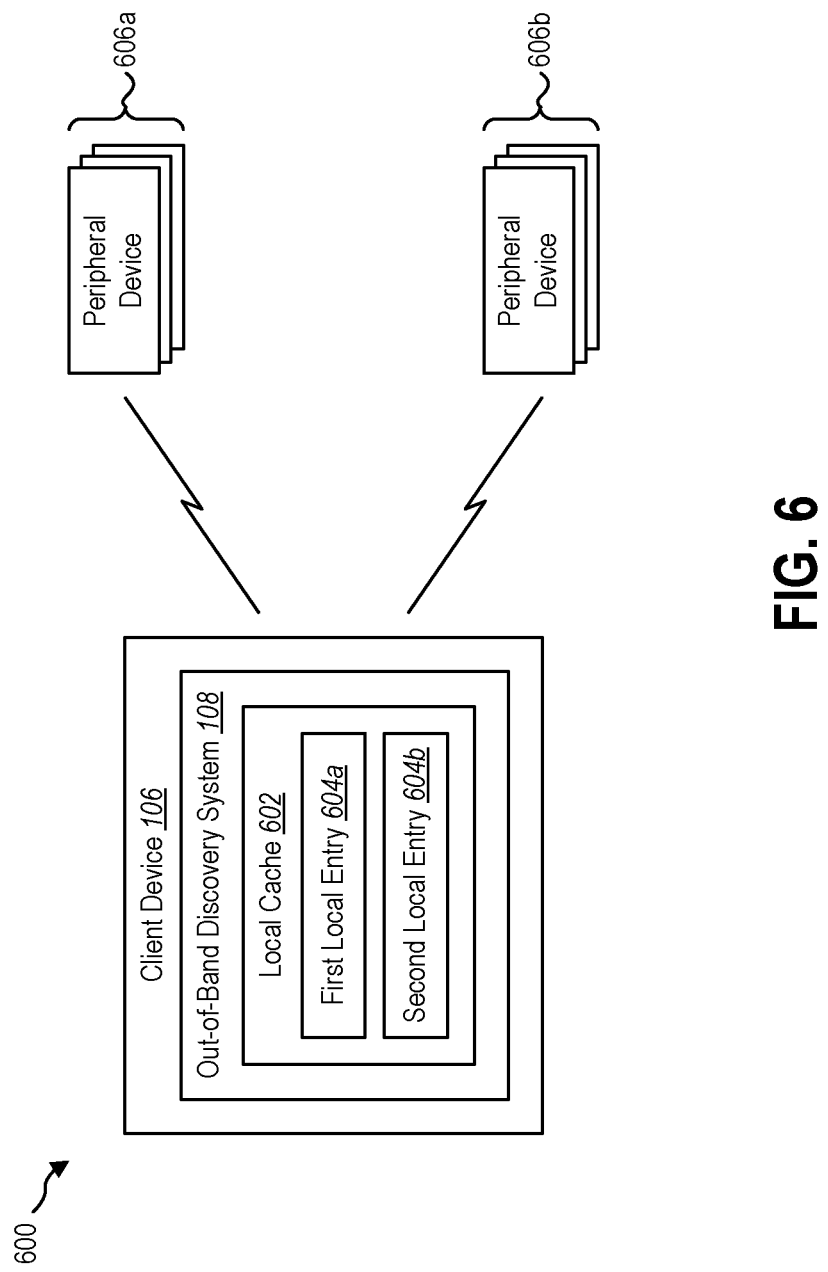
FIG. 6 illustrates another example environment of performing out-of-band discovery for peripheral devices of different equivalence classes in accordance with one or more implementations.

As mentioned above, the out-of-band discovery system 108 can enable discovery of multiple peripheral devices of the same equivalence class based on the same service database entry corresponding to a set of service attributes that the multiple peripheral devices have in common. For example, FIG. 6 illustrates an example environment 600 including a client device 106 and an out-of-band discovery system 108 implemented thereon. Similar to one or more embodiments described above, the out-of-band discovery system 108 includes a local cache 602, which may include similar features as the local cache 110 and other local caches discussed above. In accordance with example implementations discussed above, the out-of-band discovery system 108 may have generated the local cache 602 dynamically (e.g., updating periodically in response to interacting with different peripheral devices) or by downloading multiple service database entries from a remote source (e.g., an account cache, a service entry database).

As shown in FIG. 6, the local cache 602 includes a first local entry 604a and a second local entry 604b. The first local entry 604a may include a first hash identifier and associated service definitions corresponding to a first set of service attributes. As a result, the service definitions within the first local entry 604a may enable the client device 106 to interact with any peripheral device having a set of service attributes corresponding to the first local entry 604a. Similarly, the second local entry 604b may include a second hash identifier and associated service definitions corresponding to a second set of service attributes. As a result, the service definitions within the second local entry 604b may enable the client device 106 to interact with any peripheral device having a set of service attributes corresponding to the second local entry 604b.

As shown in FIG. 6, the environment 100 includes a first set of peripheral devices 606a corresponding to a first equivalence class. This may refer to an environment where multiple family members (or other grouping of co-users) utilize their own respective peripheral devices of the same type (e.g., a smart watch, digital pen). Because the first local entry 604a includes service definitions keyed to the set of service attributes corresponding to all of the peripheral devices form the first set of peripheral devices 606a, the out-of-band discovery system 108 can store a single entry that includes service definitions to enable the client device 106 to interact with any of the peripheral devices from the first set of peripheral devices 606a. Similarly, because the second local entry 604b includes service definitions keyed to the set of service attributes corresponding to all of the peripheral devices from the second set of peripheral devices 606b, the out-of-band discovery system 108 can similarly store a single entry to enable the client device 106 to interact with any of the peripheral devices from the second set of peripheral devices 606b.

By associating the service database entries (e.g., the local entries 604a-b) to corresponding sets of service attributes, the out-of-band discovery system 108 can reduce an amount of storage needed to facilitate interaction between a central device and any number of peripheral devices. Indeed, in an example environment where a central device communicates or otherwise interacts with many IoT devices (e.g., hundreds or thousands), storing a single service database entry can significantly save on storage space needed where traditional pairing systems would involve a separate entry for each paired device.

Figure 7:
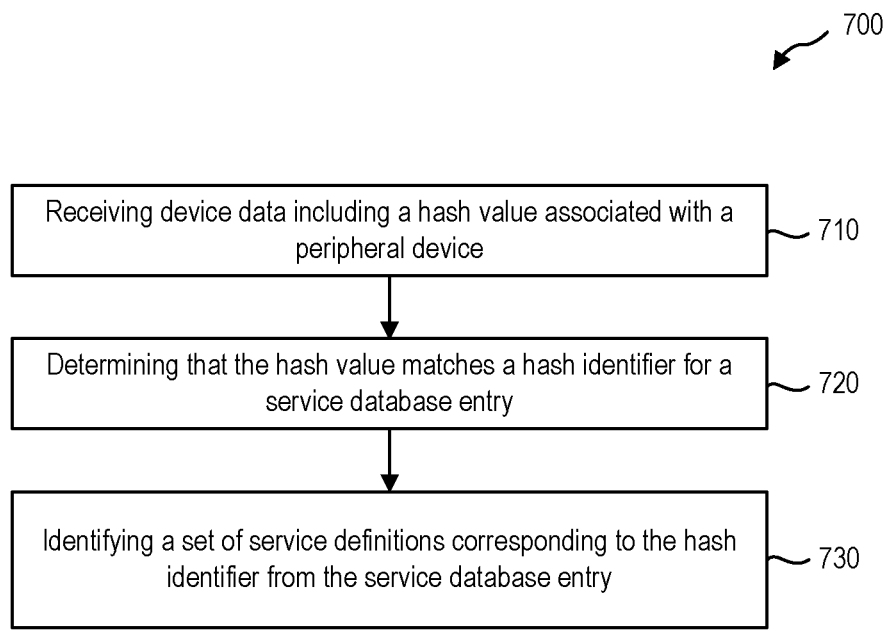
FIG. 7 illustrates an example method for performing out-of-band discovery of service definitions in accordance with one or more implementations.
Figure 8:
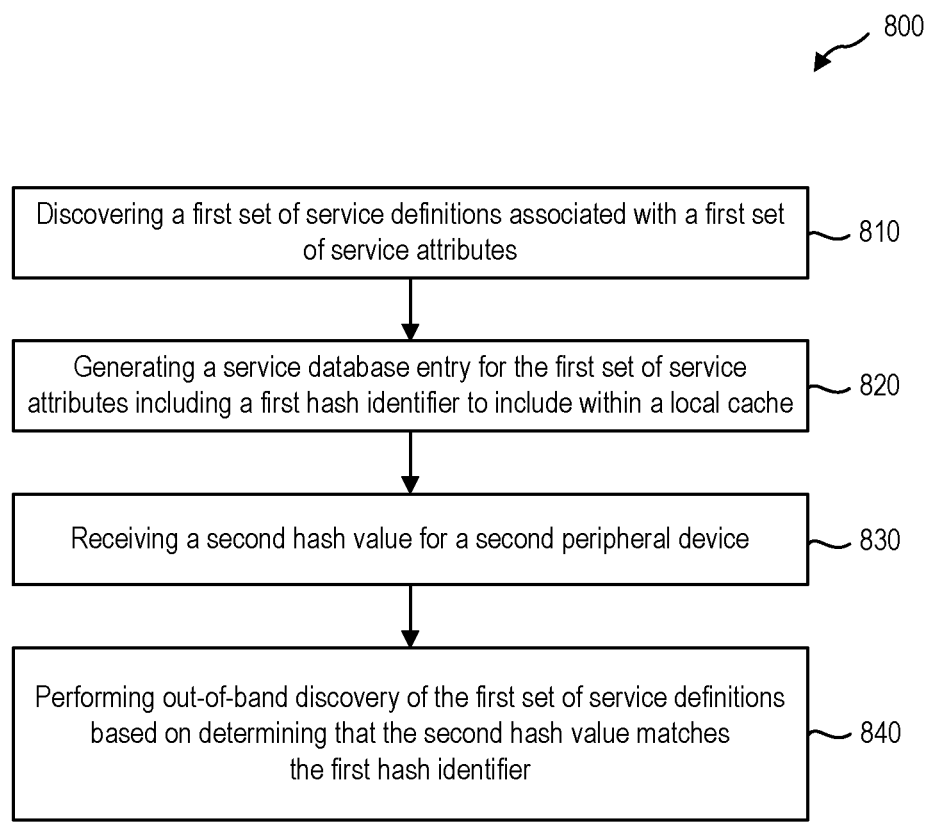
FIG. 8 illustrates another example method for performing out-of-band discovery of service definitions in accordance with one or more implementations.

Turning now to FIGS. 7-8, these figures illustrate example flowcharts including series of acts for discovering service attributes and enabling interaction between a central computing device and one or more peripheral devices. While FIGS. 7-8 illustrate acts according to one or more embodiments, alternative embodiments may omit, add to, reorder, and/or modify any of the acts shown in FIGS. 7-8. The acts of FIGS. 7-8 can be performed as part of a method. Alternatively, a non-transitory computer-readable medium can comprise instructions that, when executed by one or more processors, cause a server device to perform the acts of FIGS. 7-8. In still further embodiments, a system can perform the acts of FIGS. 7-8.

FIG. 7 illustrates a series of acts 700 for performing out-of-band discovery to discover service definitions associated with a peripheral device. In particular, the series of acts 700 includes an act 710 of receiving device data including a hash value associated with a peripheral device. For example, in one or more embodiments, the act 710 includes receiving, from a peripheral device, device data including a hash value associated with one or more service attributes of the peripheral device. In one or more implementations, the hash value is generated by the peripheral device. In addition, receiving the device data may include receiving the hash value over an in-band wireless connection between a central computing device and the peripheral device.

As shown in FIG. 7, the series of acts 700 includes an act 720 of determining that the hash value matches a hash identifier for a service database entry. For example, in one or more embodiments, the act 720 includes performing out-of-band discovery of one or more service definitions based on the hash value received from the peripheral device (e.g., where the service definition(s) enable interaction with the peripheral device) by determining that the hash value for the peripheral device matches a hash identifier associated with a service database entry from a collection of service database entries.

In one or more embodiments, determining that the hash value for the peripheral device matches the hash identifier associated with the service database entry includes querying the collection of service database entries stored within a local cache of service database entries on a central computing device and determining that the service database entry including the one or more service definitions exists within the local cache of service database entries.

As another example, the determining that the hash value for the peripheral device matches the hash identifier associated with the service database entry may include querying the collection of service database entries stored within the collection of service database entries on a server device and determining that the service database entry including the one or more service definitions exists within the collection of service database entries on the server device. In one or more embodiments, determining that the hash value for the peripheral device matches the hash identifier associated with the service database entry includes determining that the service database entry including the one or more service definitions does not exist within a local cache of service database entries on a central computing device. In addition, querying the collection of service database entries stored within the collection of service database entries on the server device may be performed in response to determining that the service database entry does not exist within the local cache. In one or more embodiments, the series of acts 700 includes updating a local cache of service database entries on a central computing device by adding the service database entry to the local cache.

As further shown in FIG. 7, the series of acts 700 may include an act 730 of identifying a set of service definitions corresponding to the hash identifier from the service database entry. For example, the act 730 may include performing an out-of-band discovery process that includes identifying the one or more service definitions from the service database entry associated with the matching hash identifier.

In one or more embodiments, performing the out-of-band discovery of the service definition(s) includes providing, to a server device, a request for a service database entry comprising a hash identifier corresponding to the hash value. Performing the out-of-band discovery may additionally include receiving, from the server device, the service database entry including the one or more service definitions based on a determination that the hash identifier matches the hash value for the peripheral device.

In one or more embodiments, performing the out-of-band discovery includes downloading a plurality of service database entries from the server device where the plurality of service database entries includes a set of service database entries corresponding to a plurality of known devices identified by a user account associated with the computing device. Performing the out-of-band discovery may also include determining that a local cache including a plurality of database entries does not include the service database entry including the hash identifier corresponding to the hash value. Providing the request to the server device may be performed in response to determining that the local cache does not include the service database entry.

The series of acts 700 may additionally include interacting with the peripheral device in accordance with the one or more service definitions identified from the service database entry. For example, interacting with a peripheral in accordance with the one or more service definitions may include accessing data stored on a memory of the peripheral device, requesting data from the peripheral device, issuing a command to the peripheral device, actuating one or more predefined functionalities of the peripheral device, causing the peripheral device to activate a functionality defined by a corresponding service definition, or establishing an ad hoc connection between a central device and the peripheral device.

In one or more embodiments, the device data received from the peripheral device includes an identifier (e.g., a random address or rotating device identifier) for the peripheral device. The series of acts 700 may additionally include determining that the identifier for the peripheral device does not match a second identifier for a previously discovered peripheral device. Moreover, the series of acts 700 may include performing the out-of-band discovery in response to determining that the identifier for the peripheral device does not match the second identifier for the previously discovered peripheral device.

The series of acts 700 may additionally include establishing an in-band connection with the peripheral device. The series of acts 700 may also include determining that a first duration of time associated with discovering the one or more service definitions via the in-band connection with the peripheral device is greater than a second duration of time associated with performing the out-of-band discovery of the one or more service definitions. The series of acts 700 may further include performing the out-of-band discovery of the one or more service definitions based on determining that the first duration of time is greater than the second duration of time.

In one or more embodiments, the series of acts 700 includes determining a first duration of time associated with identifying the one or more service definitions by way of establishing a pairing relationship between the computing device and the peripheral device. In addition, the series of acts 700 may include a second duration of time associated with receiving the service database entry from the server device. In one or more embodiments, the series of acts 700 includes performing the out-of-band discovery of the one or more service definitions in response to determining that the first duration of time exceeds the second duration of time.

FIG. 8 illustrates another series of acts 800 for discovering service definitions for one or more peripheral devices in accordance with one or more embodiments described herein. As shown in FIG. 8, the series of acts 800 includes an act 810 of discovering a first set of service definitions associated with a first set of service attributes. For example, the act 810 may include discovering a first set of service definitions that enable interaction with a first peripheral device associated with a first set of service attributes.

As further shown in FIG. 8, the series of acts 800 may include an act 820 of generating a service database entry for the first set of service attributes including a first hash identifier to include within a local cache. For example, the act 820 may include generating a first service database entry for the first set of service attributes to include within a local cache of service database entries where the service database entry includes a first hash identifier and the first set of service definitions corresponding to the first set of service attributes.

The series of acts 800 may also include an act 830 of receiving a second hash value for a second peripheral device. For example, the act 830 may include receiving, from a second peripheral device, a second hash value associated with a second set of service attributes of the second peripheral device. The series of acts 800 may also include an act 840 of performing out-of-band discovery of the first set of service definitions based on determining that the second hash value matches the first hash identifier. For example, the act 840 may include performing out-of-band discovery of the first set of service definitions to enable interaction with the second peripheral device based on determining that the second hash value for the second peripheral device matches the first hash identifier from the first service database entry. In one or more embodiments, determining that the second hash value matches the first hash identifier includes comparing the second hash value for the second peripheral device to a plurality of hash identifiers from the local cache of service database entries.

The series of acts 800 may additionally include receiving, from a third peripheral device, a third hash value associated with a third set of service attributes of the third peripheral device. The series of acts 800 may include performing out-of-band discovery of an additional set of service definitions that enable interaction with the third peripheral device where performing the out-of-band discovery of the additional set of service definitions includes downloading an additional service database entry corresponding to the third hash value from a server device. In one or more embodiments, performing out-of-band discovery of the additional set of service definitions includes determining that the local cache does not include a service database entry including the third hash value. In addition, downloading the additional service database entry may be performed in response to determining that the local cache does not include the service database entry including the third hash value. In one or more embodiments, the series of acts 800 includes updating the local cache of service database entries to include the additional service database entry comprising the third hash value and additional set of service definitions to enable out-of-band discovery of the additional set of service definitions for one or more additional peripheral devices having a matching set of service attributes as the third peripheral device.

Figure 9:
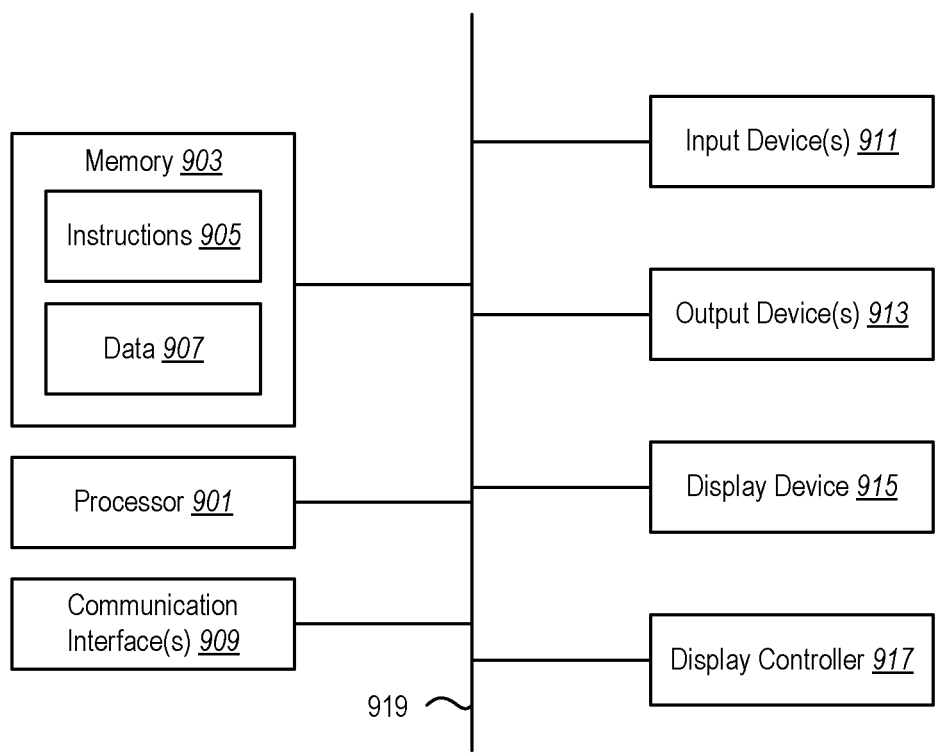
FIG. 9 illustrates certain components that may be included within a computer system.

FIG. 9 illustrates certain components that may be included within a computer system 900. One or more computer systems 900 may be used to implement the various devices, components, and systems described herein.

The computer system 900 includes a processor 901. The processor 901 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
receiving, from a peripheral device via an established direct communication between the peripheral device and a central computing device, device data including a hash value associated with one or more service attributes of the peripheral device; and
performing out-of-band discovery of one or more service definitions based on the hash value received from the peripheral device, wherein the one or more service definitions enable interaction with the peripheral device, and wherein performing out-of-band discovery of the one or more service definitions comprises:
determining that the hash value for the peripheral device matches a hash identifier associated with a service database entry from a collection of service database entries, the service database entries including hash identifiers and service identifiers corresponding to one or more peripheral devices with which the central computing device has previously interacted; and
identifying the one or more service definitions from the service database entry associated with the matching hash identifier.

2. The method of claim 1, wherein the device data includes an identifier for the peripheral device, wherein the method further comprises:
determining that the identifier for the peripheral device does not match a second identifier for a previously discovered peripheral device; and
performing the out-of-band discovery in response to determining that the identifier for the peripheral device does not match the second identifier for the previously discovered peripheral device.

3. The method of claim 1, wherein the hash value is generated by the peripheral device.

4. The method of claim 1, wherein determining that the hash value for the peripheral device matches the hash identifier associated with the service database entry comprises:
querying the collection of service database entries stored within a local cache of service database entries, the local cache being maintained on a local storage of the central computing device; and determining that the service database entry including the one or more service definitions exists within the local cache of service database entries.

5. The method of claim 1, wherein determining that the hash value for the peripheral device matches the hash identifier associated with the service database entry comprises:
querying the collection of service database entries stored within the collection of service database entries, the collection of service database entries being maintained on a server device; and
determining that the service database entry including the one or more service definitions exists within the collection of service database entries on the server device.

6. The method of claim 5, wherein determining that the hash value for the peripheral device matches the hash identifier associated with the service database entry comprises:
determining that the service database entry including the one or more service definitions does not exist within a local cache of service database entries, the local cache being maintained on a local storage of the central computing device; and
wherein querying the collection of service database entries stored within the collection of service database entries on the server device is performed in response to determining that the service database entry does not exist within the local cache.

7. The method of claim 5, further comprising updating a local cache of service database entries on the central computing device by adding the service database entry to the local cache.

8. The method of claim 1, further comprising interacting with the peripheral device in accordance with the one or more service definitions identified from the service database entry.

9. The method of claim 8, wherein interacting with the peripheral device comprises one or more of:
accessing data stored on a memory of the peripheral device;
requesting data from the peripheral device;
issuing a command to the peripheral device;
actuating one or more predefined functionalities of the peripheral device;
causing the peripheral device to activate a functionality defined by a corresponding service definition; or
establishing an ad hoc connection between a central device and the peripheral device.

10. The method of claim 1, further comprising:
establishing an in-band connection with the peripheral device;
determining that a first duration of time associated with discovering the one or more service definitions via the in-band connection with the peripheral device is greater than a second duration of time associated with performing the out-of-band discovery of the one or more service definitions; and
performing the out-of-band discovery of the one or more service definitions based on determining that the first duration of time is greater than the second duration of time.

11. A computer-readable storage medium including instructions thereon that, when executed by at least one processor, cause a computing device to:
discover a first set of service definitions that enable interaction with a first peripheral device associated with a first set of service attributes;
generate a first service database entry for the first set of service attributes to include within a local cache of service database entries maintained on a storage of the computing device, the first service database entry comprising a first hash identifier and the first set of service definitions corresponding to the first set of service attributes;
receive, from a second peripheral device via an established direct communication between the peripheral device and the computing device, a second hash value associated with a second set of service attributes of the second peripheral device; and
perform out-of-band discovery of the first set of service definitions to enable interaction with the second peripheral device based on determining that the second hash value for the second peripheral device matches the first hash identifier from the first service database entry.

12. The computer-readable storage medium of claim 11, wherein determining that the second hash value matches the first hash identifier comprises comparing the second hash value for the second peripheral device to a plurality of hash identifiers from the local cache of service database entries.

13. The computer-readable storage medium of claim 11, further comprising instructions that, when executed by the at least one processor, cause the computing device to:
receive, from a third peripheral device, a third hash value associated with a third set of service attributes of the third peripheral device; and
perform out-of-band discovery of an additional set of service definitions that enable interaction with the third peripheral device, wherein performing the out-of-band discovery of the additional set of service definitions comprises downloading an additional service database entry corresponding to the third hash value from a collection of service database entries being maintained on a server device.

14. The computer-readable storage medium of claim 13, wherein performing out-of-band discovery of the additional set of service definitions comprises:
determining that the local cache does not include a service database entry including the third hash value; and
wherein downloading the additional service database entry is performed in response to determining that the local cache does not include the service database entry including the third hash value.

15. The computer-readable storage medium of claim 13, further comprising instructions that, when executed by the at least one processor, cause the computing device to:
update the local cache of service database entries to include the additional service database entry comprising the third hash value and additional set of service definitions to enable out-of-band discovery of the additional set of service definitions for one or more additional peripheral devices having a matching set of service attributes as the third peripheral device.

16. A system, comprising:
one or more processors;
memory in electronic communication with the one or more processors; and
instructions stored in the memory, the instructions being executable by the one or more processors to cause a computing device to:
receive, from a peripheral device via an established direct communication between the peripheral device and the computing device, device data including a hash value associated with one or more service attributes of the peripheral device; and perform out-of-band discovery of one or more service definitions based on the hash value received from the peripheral device, wherein the one or more service definitions enable interaction with the peripheral device, and wherein performing out-of-band discovery of the one or more service definitions comprises:
  providing, to a server device, a request for a service database entry comprising a hash identifier corresponding to the hash value, the service database entry being associated with a peripheral device from one or more peripheral devices with which the computing device has previously interacted; and
  receiving, from the server device, the service database entry comprising the one or more service definitions based on a determination that the hash identifier matches the hash value for the peripheral device.

17. The system of claim 16, wherein performing the out-of-band discovery comprises downloading a plurality of service database entries from the server device, the plurality of service database entries comprising a set of service database entries corresponding to a plurality of known devices identified by a user account associated with the computing device.

18. The system of claim 16, wherein performing the out-of-band discovery comprises:
  determining that a local cache including a plurality of database entries does not include the service database entry including the hash identifier corresponding to the hash value; and
  wherein providing the request to the server device is performed in response to determining that the local cache does not include the service database entry.

19. The system of claim 16, further comprising instructions that, when executed by the one or more processors, cause the computing device to:
  determine a first duration of time associated with identifying the one or more service definitions by way of establishing a pairing relationship between the computing device and the peripheral device;
  determine a second duration of time associated with receiving the service database entry from the server device; and
  perform the out-of-band discovery of the one or more service definitions in response to determining that the first duration of time exceeds the second duration of time.

20. The system of claim 16, wherein the device data includes an identifier for the peripheral device, and wherein the system further comprises instructions that, when executed by the one or more processors, cause the computing device to:
  determine that the identifier for the peripheral device does not match a second identifier for a previously discovered peripheral device; and
  perform the out-of-band discovery in response to determining that the identifier for the peripheral device does not match the second identifier for the previously discovered peripheral device.

\* \* \* \* \*